United States Patent [19]

Heybutzki et al.

[11] 4,418,544

[45] Dec. 6, 1983

[54] PUMP FOR VERY COLD LIQUIDS

[75] Inventors: Helmut Heybutzki; Wolfgang Krug; Johann Seferiadis, all of Jülich, Fed. Rep. of Germany

[73] Assignee: Kernforschungsanlage Jülich GmbH

[21] Appl. No.: 392,652

[22] Filed: Jun. 28, 1982

[30] Foreign Application Priority Data

Jul. 3, 1981 [DE] Fed. Rep. of Germany ....... 3126293

[51] Int. Cl.³ .............................................. F17C 13/00
[52] U.S. Cl. ........................................ 62/55; 417/901
[58] Field of Search .................... 62/51, 52, 53, 55; 417/901

[56] References Cited

U.S. PATENT DOCUMENTS

| | | | |
|---|---|---|---|
| 2,837,898 | 6/1958 | Ahsltrand | 62/55 |
| 2,888,879 | 6/1959 | Gaarder | 62/55 |
| 3,011,450 | 12/1961 | Tyree, Jr. | 62/55 |
| 3,212,280 | 10/1965 | Thomas et al. | 62/55 |
| 3,216,210 | 11/1965 | Klipping | 62/55 |
| 3,379,132 | 4/1968 | Wagner | 62/55 |
| 3,431,744 | 3/1969 | Veilex et al. | 62/55 |

FOREIGN PATENT DOCUMENTS 1653578  4/1971  W. Germany.

*Primary Examiner*—Ronald C. Capossela
*Attorney, Agent, or Firm*—Frishauf, Holtz, Goodman & Woodward

[57] ABSTRACT

A pump for cryogenic liquids is provided with an enclosing vessel of the construction of a Dewar flask. A submerged multistage rotary pump is suspended from the mouth of the flask by means of a system providing thermal insulation opposing the flow of heat down the neck of the flask. The drive motor is coupled to the drive shaft of the immersion pump through a magnet coupling of which the elements are separated by a pressure seal. The latter and the extensive thermal insulation make the pump suitable for pumping liquid air or liquid nitrogen in a pressurized closed circuit and the presence of a supply of the cryogenic liquid around the pump itself makes it possible to start the pump at once after a quiescent period. A level-control sonde operates to assure that the presence of the necessary minimum of liquid in the vessel.

12 Claims, 1 Drawing Figure

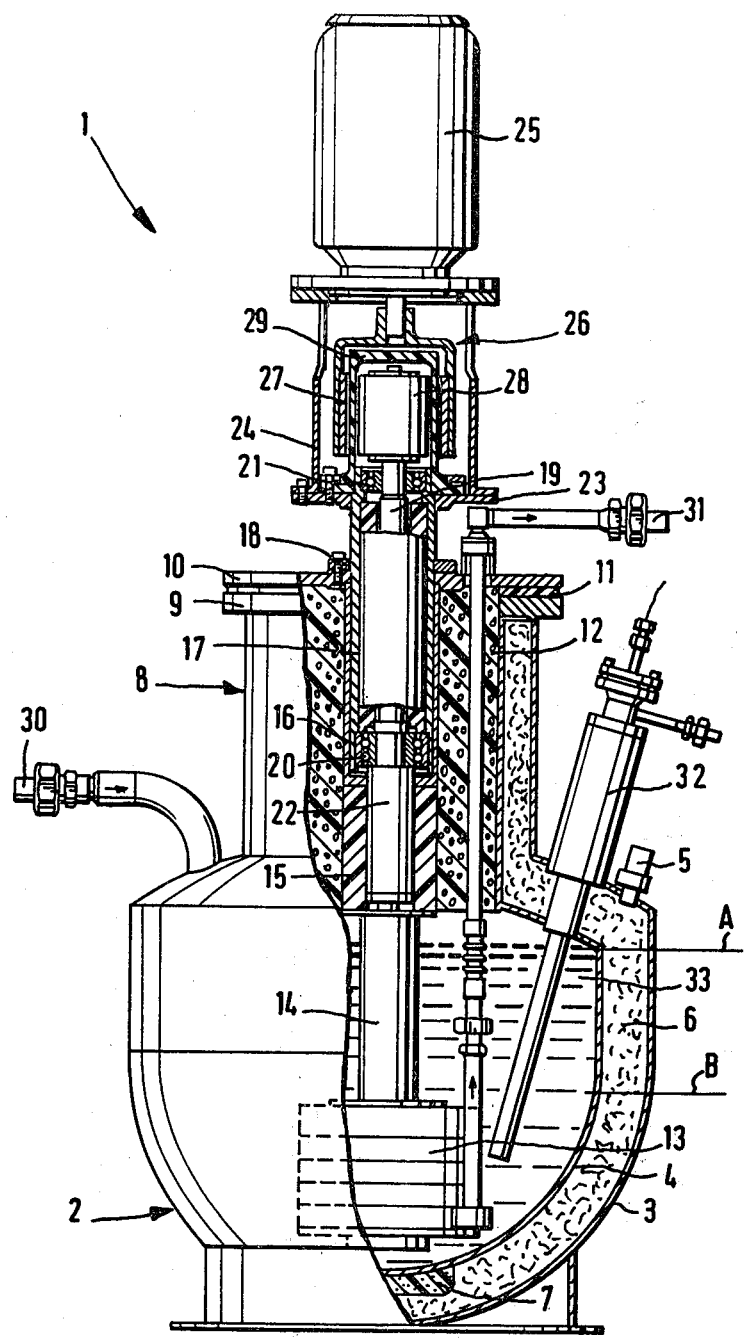

PUMP FOR VERY COLD LIQUIDS

The invention concerns a pump for very cold liquids, sometimes referred to as cryogenic liquids, such as liquid nitrogen or liquid air. More particularly it concerns a pump comprising a heat-insulated vessel and an immersed pump with a shaft extending out of the pump vessel and connected with a drive motor.

Two kinds of pumps are known for pumping cryogenic liquids. One kind utilizes an immersed pump disposed in a heat-insulated pump vessel, with the pump drive shaft being brought out of the pump vessel to an exterior drive motor without a tight seal and also uninsulated for heat. Such a pumping device is not well suited for incorporation in a closed and pressurized circulation system that is maintained in operating condition. Furthermore, the heat insulation of the pump is not good enough to displace or feed liquid nitrogen or liquid air without icing-up of the pump apparatus.

In contrast to the above-described first kind of pump, the so-called cryostats, which have pressure-tight casings are suited for incorporation in closed and pressurized systems. These, however, have no pump vessel serving as a container or reservoir in which a certain amount of the liquid can be kept ready for the circulation system. Before each starting into operation, these pumps must be manually operated to make them cold every time, for example, when a flow of liquid nitrogen or liquid air is to be started. Since this type of pump, moreover, is not insulated for heat, high heat losses occur with icing of the pump.

THE INVENTION

It is an object of the present invention to constitute a pump for very cold liquids in such a way that they can be operated in pressurized circulation automatically with low heat losses.

Briefly, an enclosing pump vessel for the liquid covering the immersion pump is constructed hermetically closed, the immersion pump is suspended in heat-insulated fashion and the drive shaft is likewise insulated for heat in the axial direction. Because of the hermetically closed construction of the pump vessel and the heat insulation, both of the immersion pump and the drive shaft, the pump apparatus of the invention can be operated in pressurized circulating systems with minimum heat losses. Automatic operation becomes possible because a certain supply of liquid can always be held in the pump vessel to cover the immersion pump, so that an initial operation of making the pump cold after a period of quiescence is not necessary. The pump apparatus constituted in this manner is accordingly well suited for the movement of liquid air and liquid nitrogen within a closed system that is under pressure.

In the working out of the invention, it is desirable for the pump vessel to consist of an outer and inner casing spaced from each other, with the intervening space evacuated. In this manner, heat transfer by conduction is avoided as much as possible. In order to hold down also the transfer of heat by radiation, in the evacuated intermediate space, a plastic film coated on one side with metal, preferably aluminum, should be inserted for reflecting heat radiation back to the exterior. Moisture evaporating from the surfaces in the vacuum can also be usefully absorbed by a pad of silica gel. The evacuation can be carried out by means of a valve provided for the purpose, and that valve can at the same time serve as a safety valve (overpressure valve).

The pump vessel is preferably provided with an upward-leading pipe stub, in which the immersion pump is suspended and through which the drive shaft passes. The provision of the pump vessel as a dewar flask provides a particularly favorable construction for the vessel. In such a case the pipe stub (flask neck) should be filled on the inside with an insulating mass in order to reduce the heat transfer there to a minimum.

The heat insulation of the drive shaft can be obtained by providing an insulating piece between a bearing block and the immersion pump. This insulation preferably consists of stacked disks of polytetrafluoroethylene (commonly sold under the trademark Teflon). Heat transfer in the axial direction is thereby limited to the greatest possible extent, in cooperation with the still more effective provision of a contactless permanent magnet coupling between the drive motor and the drive shaft. The drive-shaft part of the permanent magnet coupling can then be covered by a closure gap that is pressure-tight, so as to assure complete sealing of the system along with maximum heat insulation.

The heat-insulated suspension of the immersion pump can be accomplished with the affixation of a surrounding insulating covering on the shaft. This insulating covering can be fastened to a cover of the pump vessel by means of a carrier tube or shell, in order to obtain easy capability of dissassembly. The insulating covering here also is advantageously produced of a considerable number of layers of polytetrafluoroethylene disks.

A still more thorough insulation effect can be obtained by providing intermediate spaces between the covering insulating and, on one hand, the drive shaft, and, on the other hand, its bearing.

The pump vessel should have a vessel flange in the region where the drive shaft comes out. A cover is then fastened onto the flange, with an insulating layer being inserted between the cover and flange.

In order to make sure that the immersion pump always lies within the pump vessel at a level below the surface of the liquid, a liquid level monitoring sonde dips into the pump vessel. This sonde can be connected with a control apparatus to require admission of more liquid before any pumping is done that would lower the level excessively.

As a practical matter, the pump vessel for practice of the invention is preferably designed for a pressure of at least 4 bars.

THE DRAWING

The invention is further described by way of illustrative example with reference to the annexed drawing, which shows a side elevation, mostly in section, of a pump apparatus having a pump supply vessel in the form of a Dewar flask.

DESCRIPTION OF THE ILLUSTRATED EMBODIMENT

The pump apparatus 1 for circulating very cold liquids in a circulation system not shown in the drawing comprises a pump vessel 2 constituted as a Dewar flask and consisting of an outer casing 3 and an inner casing 4 spaced therefrom.

The intermediate space between the outer casing 3 and the inner casing 4 is put under vacuum by evacuation through a valve 5 in order to exclude conduction of heat so far as possible. The evacuation valve 5 serves at the same time as a safety valve in case of overpressure through warming. In addition, a pleated synthetic resin film 6 coated with aluminum on one side is provided in the intermediate space which, as the result of the coating, reflects heat radiation towards the exterior and thus prevents heat transfer by radiation. In the lower region of the intermediate space, a silica gel pad 7 is provided that takes up the moisture that in time evaporates from the surfaces in the vacuum.

The pump flask 2 extends upward in the form of a flask neck 8, ending in a flange 9. A cover 10 is fastened onto the flange 9 with an insulation layer 11 interposed between cover and flange. The flask neck 8 is filled with a thick mass 12 of foamed synthetic resin inwards from the inner casing 4, in order to reduce heat transfer in this region so far as possible.

An immersion-type pump 13, in the form of a five-stage centrifugal pump, is located in the lower part of the pump vessel 2. The support 2 or fixed shaft 14 is fastened at its upper end to a multi-layer Teflon sleeve 15 that contributes substantially to the thermal insulation. The Teflon sleeve 15 is set into the insulating mass 12 and is fastened at its upper end to a carrier sleeve 16 connected to the cover 10.

A bearing block 17 is set into the carrier sleeve 16 and is screwed onto the cover 10 by an annular strip 18. A drive shaft 19 is mounted in the bearing block 17 by means of two roller bearings 20 and 21. Below these bearings, the drive shaft 19 is prolonged in an insulation shaft piece 22 that consists of teflon disks put together in a multi-layer structure in order to obstruct heat transfer in the axial direction. At the lower end, the insulation shaft piece 22 is connected with the rotary inner member of the pump shaft 14.

At the upper end of the bearing block 17, an annular flange 23 is welded on. At its outer edge, a motor support 24 is screwed on, which carries at its upper end the drive motor 25 which is constituted as a three-phase a.c. motor. The drive motor 25 and the drive shaft 19 are coupled together in a contactless way by a magnet coupling 26. The magnet coupling 26 consists on the motor side of a magnet shell 27 and on the drive shaft side of a magnet cylinder 28 extending into the magnet shell 27. Between the two, a pressure-tight screwed-on closure cap 29 is provided covering the magnet cylinder and sealing off the inner edge of the ring flange 23. In this manner, an absolutely pressure-tight seal is produced.

At left in the view shown in the drawing, a supply line 30 discharges into the pump vessel 2. The supply line 30 may, for example, be part of a closed liquid nitrogen supply circulation system. A pressure line 31 leading out from the immersion pump 13 first leads vertically upwards through the insulating mass 12, exits from the pressure vessel at the cover 10 and bends rectangularly to the right. A liquid level monitoring sonde 32 extends into the pump vessel 2 and makes it possible to hold the liquid supply 33 at a level between a maximum level (line A) and a minimum level (line B). As a result, the immersion pump 13 is always below the liquid level, so that no special provisions are necessary for starting-up operating of the pump from a quiescent condition.

Although the invention has been described with a particular illustrative example, it will be understood that variations and modifications are possible within the inventive concept.

References to related publications (1) Philips publication Nr. 9499 390 011 77 "PW 7211 ... PW 7219 Medium pressure pump"
(2) Cryostar publication "Instructions for setting going and maintenance of liquid gas-centrifugal pumps" Typ:SB 76
(3) British Pat. No. 1 132 698
(4) U.S. Pat. No. 2 158 182

We claim:

1. Pumping apparatus for very cold liquids comprising:
   a thermally insulated and pressure-tight sealed vessel having a thermally insulated neck (8) and equipped with an inlet and an outlet respectively for introduction and removal of a very cold liquid;
   an immersion-type rotary pump (13) mounted on suspension means through said neck of said vessel for operation when immersed in very cold liquid in said vessel, and connected directly to one of said inlet and outlet and to the interior of said vessel;
   a drive-shaft (19) for said rotary pump passing through said vessel neck and through said suspension means for said pump;
   bearings (20,21) for said drive-shaft held by said suspension means;
   thermal insulation means interposed in said drive shaft and in said pump suspension means for opposing heat flow down the neck of said pump, including an insulation (23) on the pump side of said bearings (20,21) and
   means for pressure-tight sealing of said neck (8) of said vessel, in the form of a seal cap (29) covering the end portion of said drive shaft (19) remote from said pump;
   a permanent magnet coupling (20) for transfer of torque to said drive shaft (19) through said cap (29), connected above said cap to a motor shaft coaxial with said drive shaft;
   a motor (25) outside said vessel for driving said motor shaft and thereby said drive shaft.

2. Pumping apparatus as defined in claim 1, in which said vessel is constructed as a Dewar flask.

3. Pumping apparatus as defined in claim 1 in which the otherwise free space in said vessel neck is filled with a thermally insulating material (12).

4. Pumping apparatus as defined in claim 1, in which said insulation piece (22) is interposed between a bearing block (17) and said rotary pump (13).

5. Pumping apparatus as defined in claim 4, in which said insulation piece consists essentially of stacked disks of polytetrafluorethylene material.

6. Pumping apparatus as defined in claim 1, in which said suspension means suspends said rotary pump by affixation thereof to an insulating mantle (15) which surrounds at least the portion of said drive-shaft in which said insulating piece (22) is located in a manner also surrounding said insulation piece.

7. Pumping apparatus as defined in claim 6, in which said insulating mantle (15) consists essentially of a multiplicity of layers formed by annular disks of polytetrafluorethylene material.

8. Pumping apparatus as defined in claim 6, in which a cover (10) is provided on said neck (8) of said vessel and a carrier shell (16) is mounted on said cover and extends into said neck, and in which said insulating mantle (15) is affixed to said carrier shell (16).

9. Pumping apparatus as defined in claim 8, in which said vessel neck (8) is provided with a flange (9) at its extremity on which said neck cover (10) is mounted, and in which an insulating washer (11) is interposed between said cover (10) and said flange (9).

10. Pumping apparatus as defined in claim 6, in which a gap is provided between said insulating mantle (15) and said drive-shaft (19,22) and also between said insulating mantle (15) and the bearing structure (17,20,21) of said drive-shaft.

11. Pumping apparatus as defined in any one of claims 1-9, in which a liquid level monitoring sonde (32) is provided in said vessel (2) for connection in circuit assuring that the liquid level in said vessel is high enough to submerge said rotary pump.

12. Pumping apparatus as defined in any one of claims 1-9, in which said vessel is of construction strong enough to withstand a pressure of at least 4 bars.

* * * * *